(12) United States Patent
Petchenev et al.

(10) Patent No.: US 7,855,545 B2
(45) Date of Patent: Dec. 21, 2010

(54) SINUSOIDAL MODULATED SIGNAL CLARIFICATION TOOL USING VARIOUS OSCILLATOR SYSTEMS

(75) Inventors: Alexei Petchenev, Minden, NV (US); John W. Grant, Gardnerville, NV (US); Olga Malakhova, Carson City, NV (US)

(73) Assignee: General Electric Company, Schenectady, NY (US)

( * ) Notice: Subject to any disclaimer, the term of this patent is extended or adjusted under 35 U.S.C. 154(b) by 487 days.

(21) Appl. No.: 11/653,852

(22) Filed: Jan. 17, 2007

(65) Prior Publication Data

US 2008/0169801 A1 Jul. 17, 2008

(51) Int. Cl.
*G01R 23/16* (2006.01)

(52) U.S. Cl. .................. 324/76.12; 324/520; 324/76.41

(58) Field of Classification Search ............... 324/76.12
See application file for complete search history.

(56) References Cited

U.S. PATENT DOCUMENTS

| | | | | |
|---|---|---|---|---|
| 5,519,337 | A * | 5/1996 | Casada | 324/772 |
| 5,668,813 | A * | 9/1997 | Malek et al. | 370/514 |
| 6,308,140 | B1 * | 10/2001 | Dowling et al. | 702/60 |
| 6,470,458 | B1 * | 10/2002 | Dreps et al. | 713/400 |
| 7,064,556 | B2 * | 6/2006 | Petchenev et al. | 324/613 |
| 7,539,549 | B1 * | 5/2009 | Discenzo et al. | 700/28 |
| 7,561,361 | B1 * | 7/2009 | Rutherford | 360/51 |
| 7,599,421 | B2 * | 10/2009 | Sorrells et al. | 375/147 |

OTHER PUBLICATIONS

Lapedes, Daniel, McGraw-Hill Dictionary of Physics and Mathematics, McGraw-Hill Book Company, 1978, p. 821.*
Turner, Rufus, et al., The Illustrated Dictionary of Electronics, TAB Professional and Reference Books, TAB Books Inc., 1988, p. 473.*
Wei, G.W., et al., Tailoring wavelets for Chaos Control, Physics Letters A, vol. 89, No. 28, Dec. 31, 2002, p. 284103-1, 4.*
Ashwin, Peter, et al., Bubbling of attractors and synchronization of chaotic oscillators, Physics Letters A, vol. 193, 1994, p. 126-139.*
Ashwin, Peter, Nonlinear dynamics: synchronization and chaos, Nature, vol. 422, 2003, p. 384-5.*

* cited by examiner

*Primary Examiner*—Thomas Valone
(74) *Attorney, Agent, or Firm*—Nixon & Vanderhye, P.C.

(57) ABSTRACT

A sinusoidal modulated signal and noise are applied to a system consisting of two oscillators of the so-called General Type, which can be, but are not limited to, the Van der Pol type, Rotator type, Tracking Force type, Linear type, or any other type of oscillator. The two oscillators in the system can also be of different types. The General Type oscillators are tuned for specific frequencies of the incoming sinusoidal modulated signal. The process of adjusting of oscillators to an incoming signal is known as Dynamic Synchronization. During the transitional period, because the noise is random, the noise pushes the frequencies of the General Type oscillators in opposite directions over time and thus self-eliminates its impact on such oscillators. The resulting signal is much less noisy, i.e., clarified, so that the sinusoidal modulated signal can be further evaluated by, for example, extracting and further analyzing its spectral peaks.

14 Claims, 14 Drawing Sheets

SINUSOIDAL MODULATED SIGNAL CLARIFICATION TOOL USING VARIOUS OSCILLATOR SYSTEMS

CROSS REFERENCE TO RELATED APPLICATIONS

This application is related to U.S. Pat. Nos. 7,065,474, titled "Frequency rectification system: apparatus and method" and 7,064,556, titled "Frequency rectification tool for shorter waveforms", and to pending U.S. patent application Ser. No. 11/095,258, filed on Mar. 31, 2005, and titled "Systems and methods for recovering a signal of interest from a complex signal."

BACKGROUND OF THE INVENTION

Electric machines, such as motors, are used for a wide variety of applications. Knowing the frequency at which an electrical machine operates facilitates accurately determining whether the machine is malfunctioning. However, because of surrounding noise, it can be difficult to determine the operating frequency of the machine, particularly where the operating frequency of the machine is indistinguishable from the noise.

Sinusoidal modulated signals are important sources of diagnostic information for condition monitoring of certain types of machinery, such as electric motors. This is a well-known fact, as evidenced by such engineering publications as (1) Coley, Phillip. Fault Zone Analysis. Rotor. PdMA Corporation. Motor Reliability Technical Conference. May 6-8, 2003, Clearwater Beach, Fla.; (2) Variable Frequency Drives and Advanced Spectral Analysis, PdMA Corporation, 2003, p. 8-8-8-11; and (3) MCEmax Data Interpretation, PdMA Corporation, 2002, p. 199-206.

Essentially, a judgment is made about integrity of a rotor of an induction motor using certain spectral measurements. Rotor bars and/or end rings are shown to be damaged if the so-called Line Frequency Peak in the electric current spectrum of the motor has relatively high sidebands (i.e., spectral peaks at both of its sides), at a distance equal to the so-called Pole-Pass Frequency to the left and right of the Line Frequency Peak.

It is very common in practice that the sinusoidal modulated signal produced by a machine is obscured by noise, which always exists in real applications. This is especially true for smaller sidebands, which are even more prone to being obscured by noise. The ability to clarify a sinusoidal modulated signal from excess noise solves this problem, and thus enables successful condition monitoring.

BRIEF DESCRIPTION OF THE INVENTION

The present invention is directed to a system for clarifying a sinusoidal modulated signal produced by a rotating machine, such as an electric motor. A sinusoidal modulated signal, basically, is a sinusoidal signal modulated by another sinusoidal signal, with significantly smaller amplitude and of significantly lesser frequency. On a time-based plot, such as the one shown in FIG. 9a, such a signal looks like a sinusoidal signal with its amplitude slightly changing with time. On a spectrum plot, such as the one shown in FIG. 9b, this type of a signal looks like a large peak surrounded by smaller peaks, which are called sidebands.

A sinusoidal modulated signal incoming from a machine is clarified from excess noise in the present invention by inputting the signal into a pair of connected oscillators. The oscillators can be of the so-called General Type, which may be, but are not limited to, the Van der Pol type, the Rotator type, the Tracking Force type, the Linear type, or any other type of oscillator. The two oscillators can also be of two different types, e.g., a Van der Pol oscillator and a Linear oscillator. The oscillators are tuned to specific frequencies of the incoming sinusoidal modulated signal. The Van der Pol type oscillator, the Rotator type, the Tracking Force type, the Linear type oscillator, all are oscillators familiar to any person well informed in the Nonlinear Dynamics field of knowledge.

The process of adjusting an oscillator to an incoming sinusoidal modulated signal is known to any person well informed in the Nonlinear Dynamics field of knowledge as "Dynamic Synchronization." During a transitional period, because the noise coming in with the sinusoidal modulated signal is random, the noise "pushes" the frequencies of the oscillators in opposite directions over time, and thus, self-eliminates its impact on the oscillators. Thus, the impact of the noise on the process of Dynamic Synchronization is largely moot.

The sinusoidal modulated signal has constant frequencies, i.e., a center frequency and two side band frequencies, to which the oscillators synchronize over time. The resulting output signal is much less noisy, i.e., clarified, so that the sinusoidal modulated signal can be further evaluated by normal procedures. The signal can then be transformed from the time domain to the frequency domain so that the signal's spectral peaks can be directly extracted and further analyzed.

DETAILED DESCRIPTION OF THE INVENTION

Figure 1:
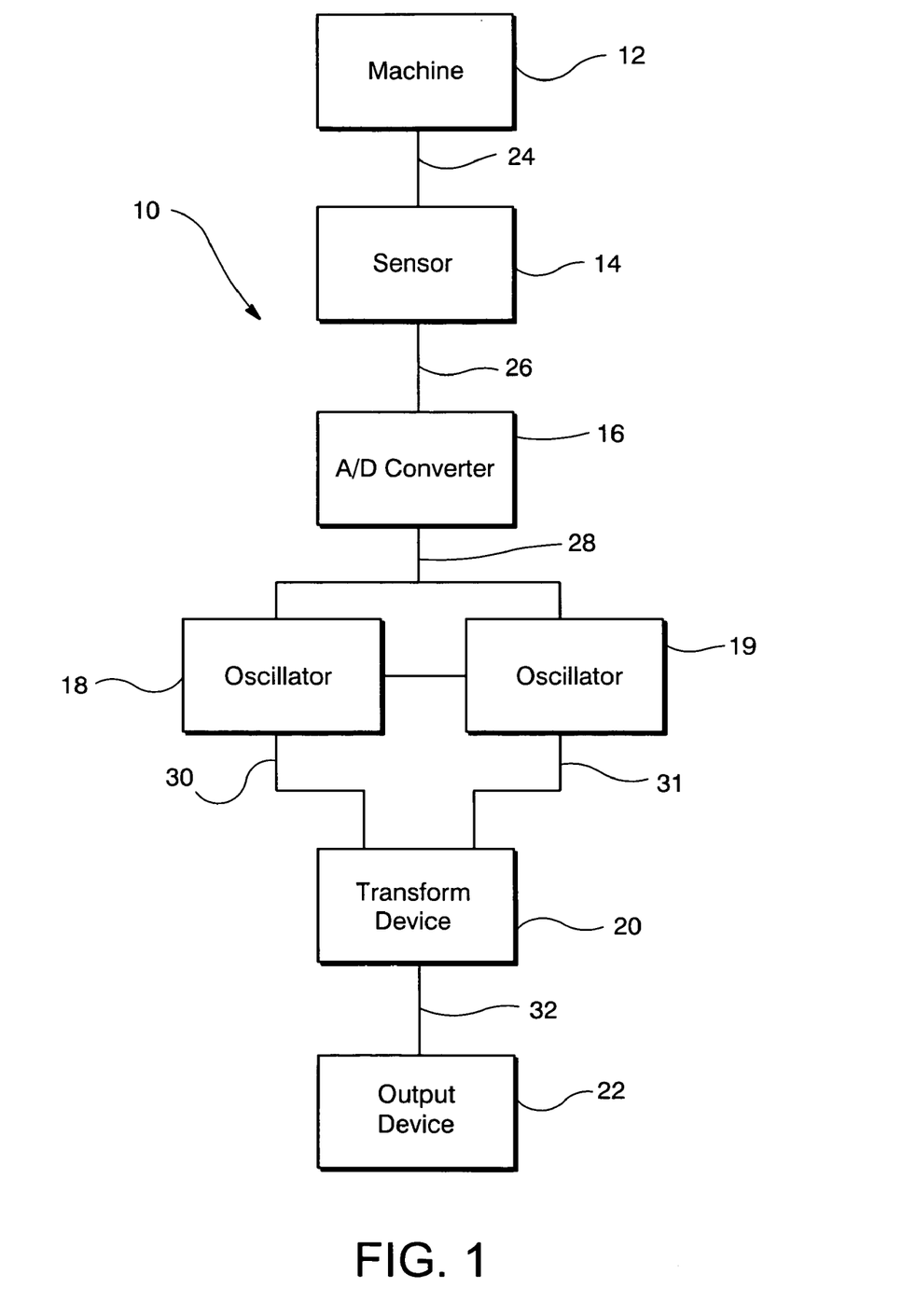
FIG. 1 is an exemplary embodiment of a system that may be used to clarify a sinusoidal modulated signal produced by a rotating machine.

FIG. 1 is an exemplary embodiment of a system 10 for clarifying a sinusoidal modulated signal, that is produced by a rotating machine, and that is surrounded by noise. System 10 includes a rotating machine 12, such as an electric motor, a sensor 14 for detecting the sinusoidal modulated signal, an analog-to-digital (A/D) converter 16, a pair of oscillators 18 and 19, a transform device 20, and an output device 22.

Sensor 14 may be, by way of example only, an electromagnetic transducer that senses a change in electromagnetic signals caused by an oscillation, such as the rotation of machine 12, a current transformer that senses the electric current waveform of machine 12, or an accelerometer that picks up a vibration signal from machine 12.

Oscillators 18 and 19 may be of the so-called General Type, which can be, but are not limited to, the Van der Pol type, the Rotator type, the Tracking Force type, the Linear type, or any other type of oscillator. Oscillators 18 and 19 can also be of two different types. "General Type Oscillators" are a combination any types of oscillators, for example, a combination of a Van der Pol Oscillator and a Linear Oscillator.

The operating coefficients of oscillators 18 and 19 are adjusted to adjust the oscillation frequency of one of the oscillators to be approximately equal to the center frequency of the sinusoidal modulated signal produced by machine 12 and the oscillation frequency of the other oscillator to be approximately equal to one of the side band frequencies of the sinusoidal modulated signal.

Transform device 20 is preferably a Fourier transform device that converts a signal from a time domain to a frequency domain. For example, in one embodiment, the Fourier transform device 20 is a Fast Fourier transform device.

Output device 22 preferably includes a display, such as a liquid crystal display or plasma display screen.

Where sensor 14 is a transducer, sensor 14 generates a field, such as an electromagnetic field, around machine 12. Machine 12 oscillates, i.e., rotates, within the electromagnetic field and changes the field to generate a machine output signal 24. Transducer 14 senses this field change caused by machine 12 and converts this electromagnetic signal into an electrical signal.

Where sensor 14 is a current transformer, it senses the electric current of machine 12, which would typically be an electric motor, and transfers the waveform to a probe that transfers the signal further, for example, to a Bently Nevada 3500 Series Monitoring System.

Where sensor 14 is an accelerometer that picks up a vibration signal from machine 12, the signal is then input to an appropriate probe into the Bently Nevada 3500 Series Monitoring System, and then input to oscillators 18 and 19.

Sensor transducer 14 senses machine output signal 24 and converts signal 24 into an analog sensed signal 26 that has a form suitable for reception by A/D converter 16. A computer 50, which may be used with system 10 of FIG. 1 to emulate oscillators 18 and 19. A/D converter 16 receives analog sensed signal 26 and converts signal 26 from an analog form to a digital form. The sensed analog signal 26 is the sinusoidal modulated signal that is generated by rotating machine 12. A/D converter 16 outputs a digital signal 28 that includes the sinusoidal modulated input signal and an input noise signal, such as white noise. Typically, the center frequency and the side band frequencies of the sinusoidal modulated signal are indistinguishable from the noise signal surrounding the sinusoidal modulated signal. An example of the center frequency is the frequency at which machine 12 operates, e.g., 50-60 Hz for an electric motor.

Oscillators 18 and 19 receive sinusoidal modulated signal 28, and one adjusts one or more of its operating coefficients to adjust its oscillation frequency to be approximately equal to the center frequency of sinusoidal modulated signal 28. The other one adjusts one or more of its operating coefficients to adjust its oscillation frequency to be approximately equal to one of the side band frequencies of sinusoidal modulated signal 28. Oscillators 18 and 19 continue to adjust operating coefficients until their oscillation frequencies are approximately equal to the center and one of the side band frequencies of sinusoidal modulated signal 28.

Figure 11A:
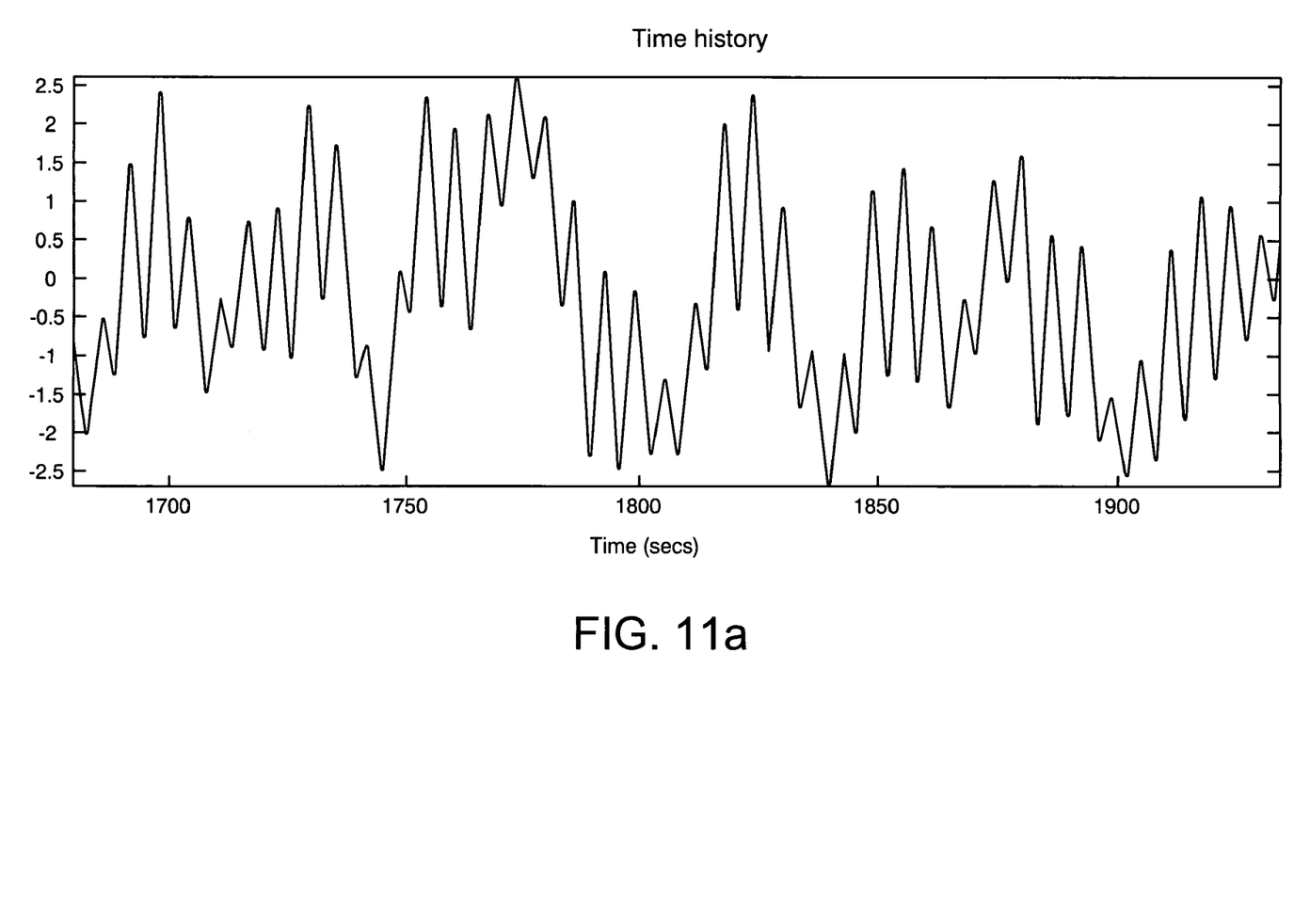
FIGS. 11a and 11b are graphs showing the noisy sinusoidal modulated signal of FIGS. 10a and 10b clarified to remove the noise in the time and in the frequency domain, respectively.
Figure 11B:
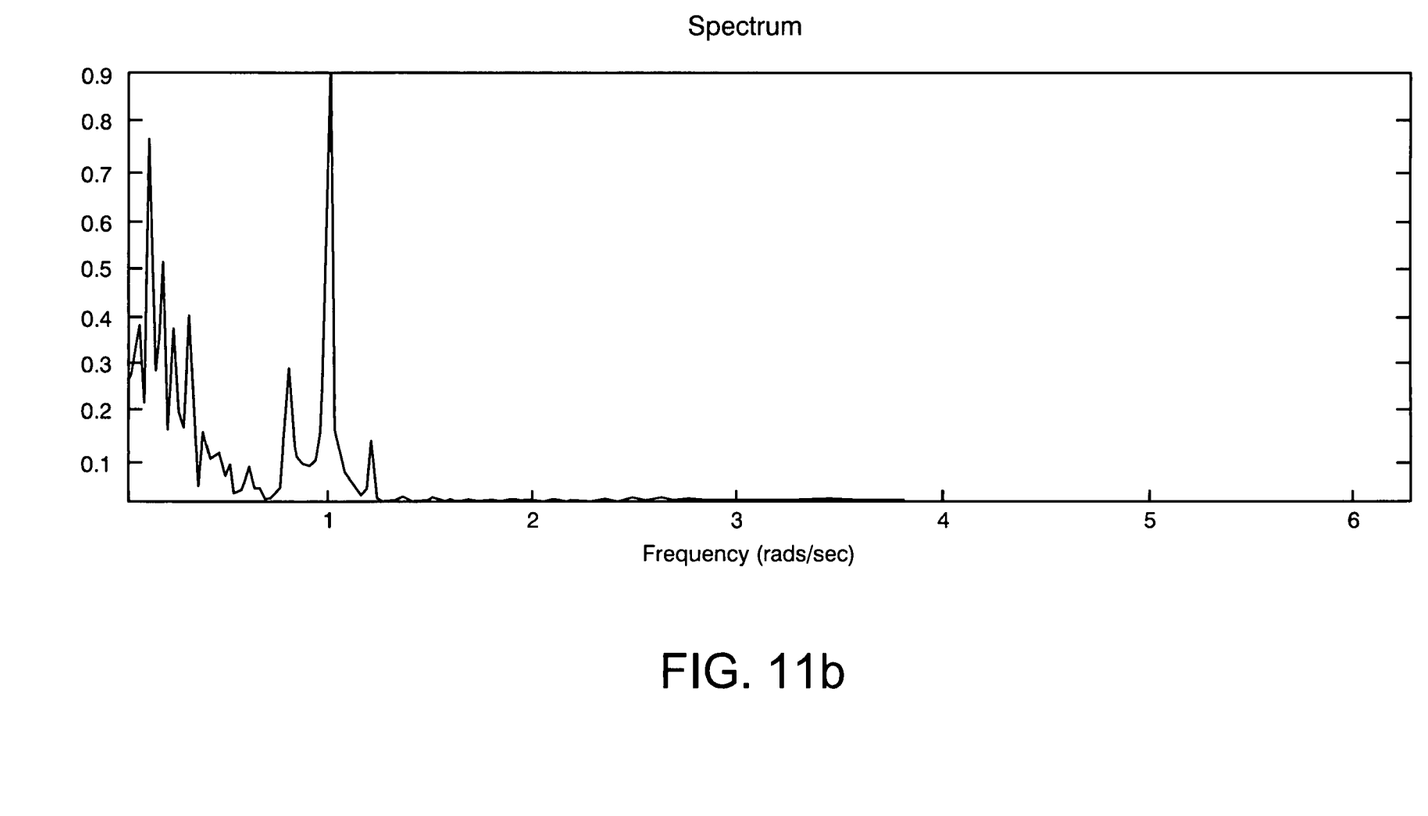

Over time, oscillators 18 and 19 synchronize their oscillation frequencies with the frequencies of sinusoidal modulated signal 28. The impact of the input noise signal on the oscillation frequencies lessens and self-eliminates over time. The process of adjusting an oscillator to an incoming signal is known as "Dynamic Synchronization." During a transitional period, because the noise coming in with the sinusoidal modulated signal (FIG. 10$a$) 28 is random, the noise "pushes" the frequencies of oscillators 18 and 19 in opposite directions over time, and thus self-eliminates its impact on such oscillators. Thus, the impact of the noise on the process of Dynamic Synchronization is moot. On the other hand, the sinusoidal modulated signal has constant frequencies, as noted above, so that oscillators 18 and 19 synchronize to them over time. The resulting signal is much less noisy, i.e., clarified, so that the clarified sinusoidal modulated signal (FIG. 11$a$) 28 can be further evaluated by normal procedures. For example, the signal's spectral peaks can be directly extracted using transform device 20 and displayed by output device 22 for further analysis (FIG. 11$b$).

Transform device 20 receives output signals 30 and 31 from oscillators 18 and 19 and transforms signals 30 and 31 from the time domain to the frequency domain. In one embodiment, transform device 20 applies a Fourier transform or alternatively a Fast Fourier transform to transform output signals 30 and 31 from the time domain to the frequency domain. Transform device 20 outputs frequency domain signals 32 and 33 to output device 22 which displays frequency domain signals 32 and 33.

An operator views output device 22 and determines whether machine 12 is oscillating properly, such as, the center signal is not too deeply modulated, or alternatively within a variance of a pre-determined depth of modulation. When machine 12 is not oscillating properly, the operator takes measures, such as, calls a repair center, to improve the operation of machine 12. For example, machine 12 may be determined to be not oscillating properly when machine 12 oscillates in such a way that sidebands are too big compared to the center peak (in other words, the center signal is too deeply modulated) or alternatively the size of sidebands (compared to the center peak) is outside a specified variance of their relative size.

Figure 2:
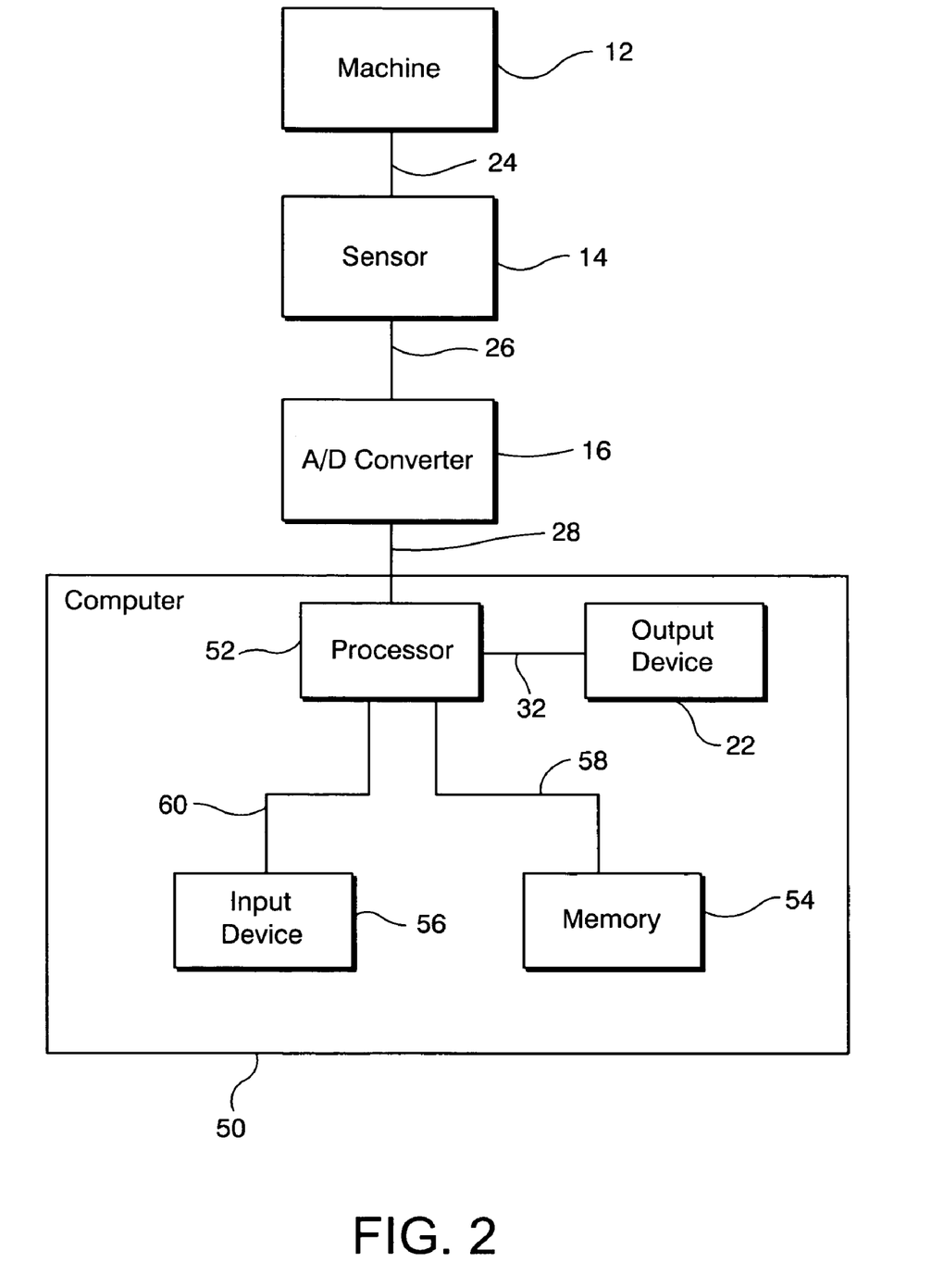
FIG. 2 is an exemplary embodiment of a computer which may be used with the system of FIG. 1.

FIG. 2 is an exemplary embodiment of a computer 50, which may be used with system 10 of FIG. 1 to emulate oscillators 18 and 19. Computer 50 includes a processor 52, a memory 54, an input device 56, and output device 22. As used herein, the term computer is not limited to just those integrated circuits referred to in the art as a computer, but broadly refers to a processor, a microcontroller, a microcomputer, a programmable logic controller, an application specific integrated circuit, and other programmable circuits, and these terms are used interchangeably herein. Memory 54 may include, but it not limited to, a computer-readable medium, such as a floppy disk, a random access memory, a compact disc—read only memory (CD-ROM), a magneto-optical disk (MOD), and/or a digital versatile disc (DVD). Input device 56 may represent, but is not limited to, a mouse, a keyboard, and/or a scanner.

Processor 52 receives sinusoidal modulated signal 28 from A/D converter 16 and processes the signal 28. Processor processes signal 28 by adjusting the operating mode to synchronize the oscillation frequencies of oscillators 18 and with the frequencies of sinusoidal modulated signal 28. Processor 52 retrieves the operating coefficients from memory 54 via a memory signal 58. The operator can use input device 56 to provide the operating coefficients to processor 52 via an input signal 60. Optionally, the operator may adjust the processor operating coefficients to synchronize the oscillation frequencies of oscillators 18 and 19 with the frequencies of sinusoidal modulated signal 28. Processor 52 generates output signals 30 and 31 by so processing sinusoidal modulated signal 28.

Processor 52 converts output signals 30 and 31 from the time domain to the frequency domain, and then outputs frequency domain signals 32 and 33. Processor 52 determines, based on frequency domain signals 32 and 33, whether the oscillation frequencies approximately equal the frequencies of sinusoidal modulated signal 28. When the oscillation frequencies of oscillators 18 and 19 are not synchronized to the frequencies of signal 28, processor 52 re-adjusts the operating coefficients to dynamically synchronize the oscillation frequencies with the frequencies of sinusoidal modulated signal 28.

Figure 3:
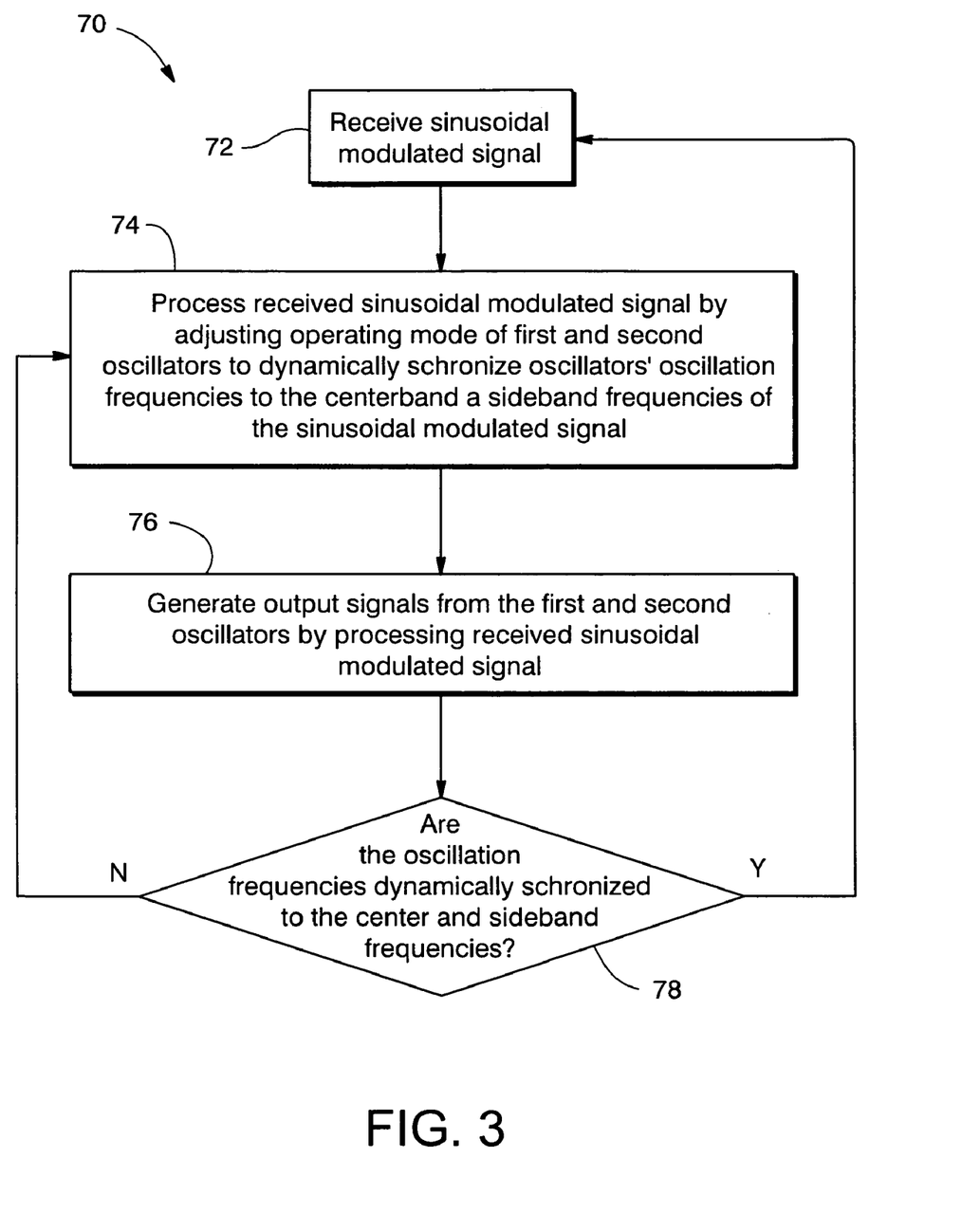
FIG. 3 is a flowchart of an exemplary method for clarifying a sinusoidal modulated signal produced by a rotating machine.

FIG. 3 is a flowchart illustrating an exemplary method 70 for clarifying a sinusoidal modulated signal. Method 70 includes receiving 72 sinusoidal modulated signal 28 from machine 12. Method 70 also includes processing 74 the sinusoidal modulated signal by adjusting the processor operating coefficients to dynamically synchronize the oscillation frequencies of oscillators 18 and 19 to the center frequency and one of the side band frequencies of the sinusoidal modulated signal 28. Method 70 also includes generating 76, the output signals 30 and 31, by synchronizing oscillators 18 and 19 to the sinusoidal modulated signal. In doing so, a determination 78 is made whether the oscillation frequencies of oscillators 18 and 19 are approximately equal to the frequencies of the sinusoidal modulated signal 28. The operating coefficients of processor 50 are then re-adjusted to adjust the oscillation frequencies to the incoming sinusoidal modulated signal when the determination 78 indicates that the oscillation frequencies are not approximately equal to the center frequency and one of the side band frequencies of the incoming sinusoidal modulation signal 28. The method 70 is repeated when another input sinusoidal modulation signal 28 is received.

Figure 4:
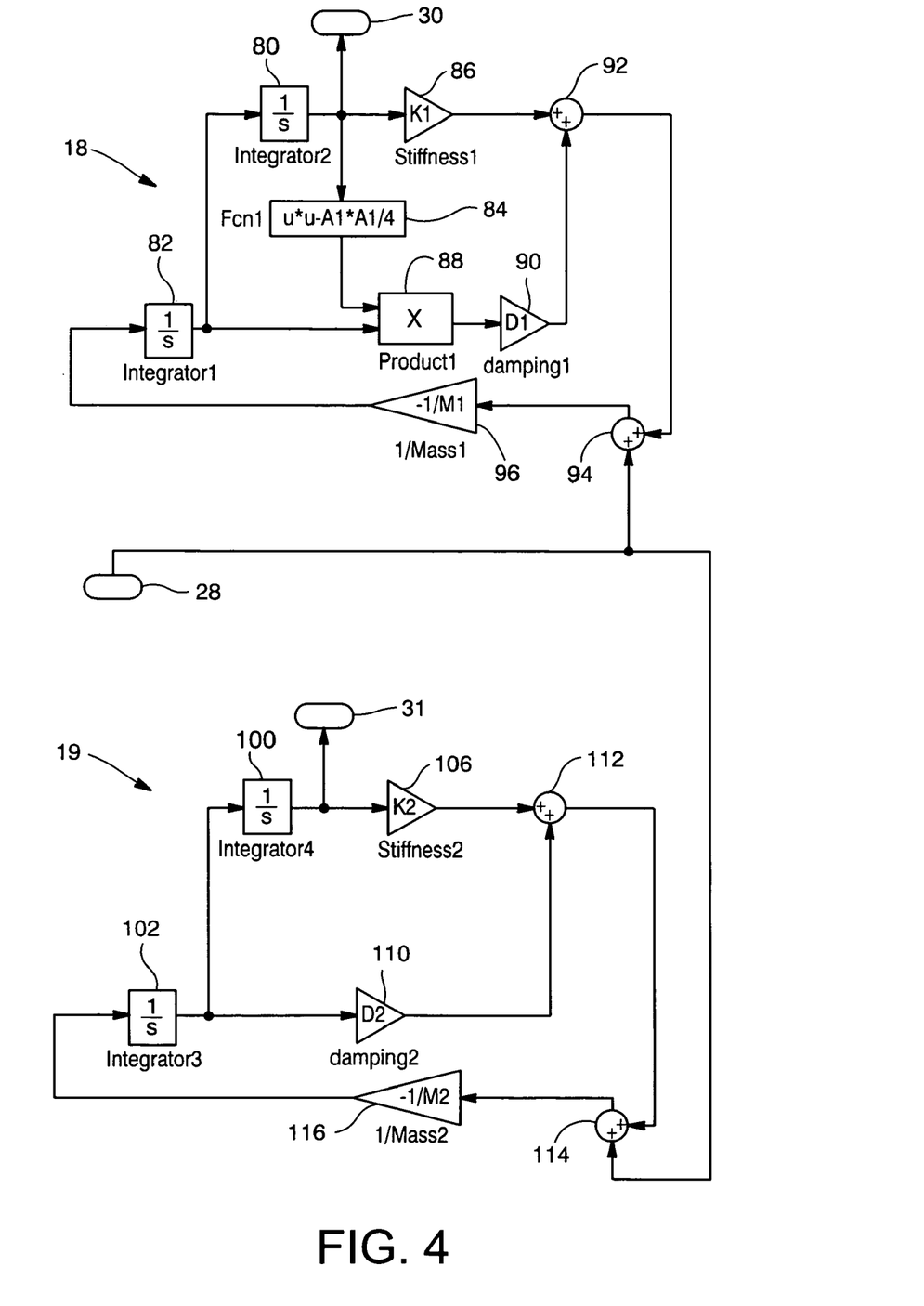
FIG. 4 is an exemplary embodiment of two connected oscillators of the General Type usable with the system of FIG. 1.
Figure 5:
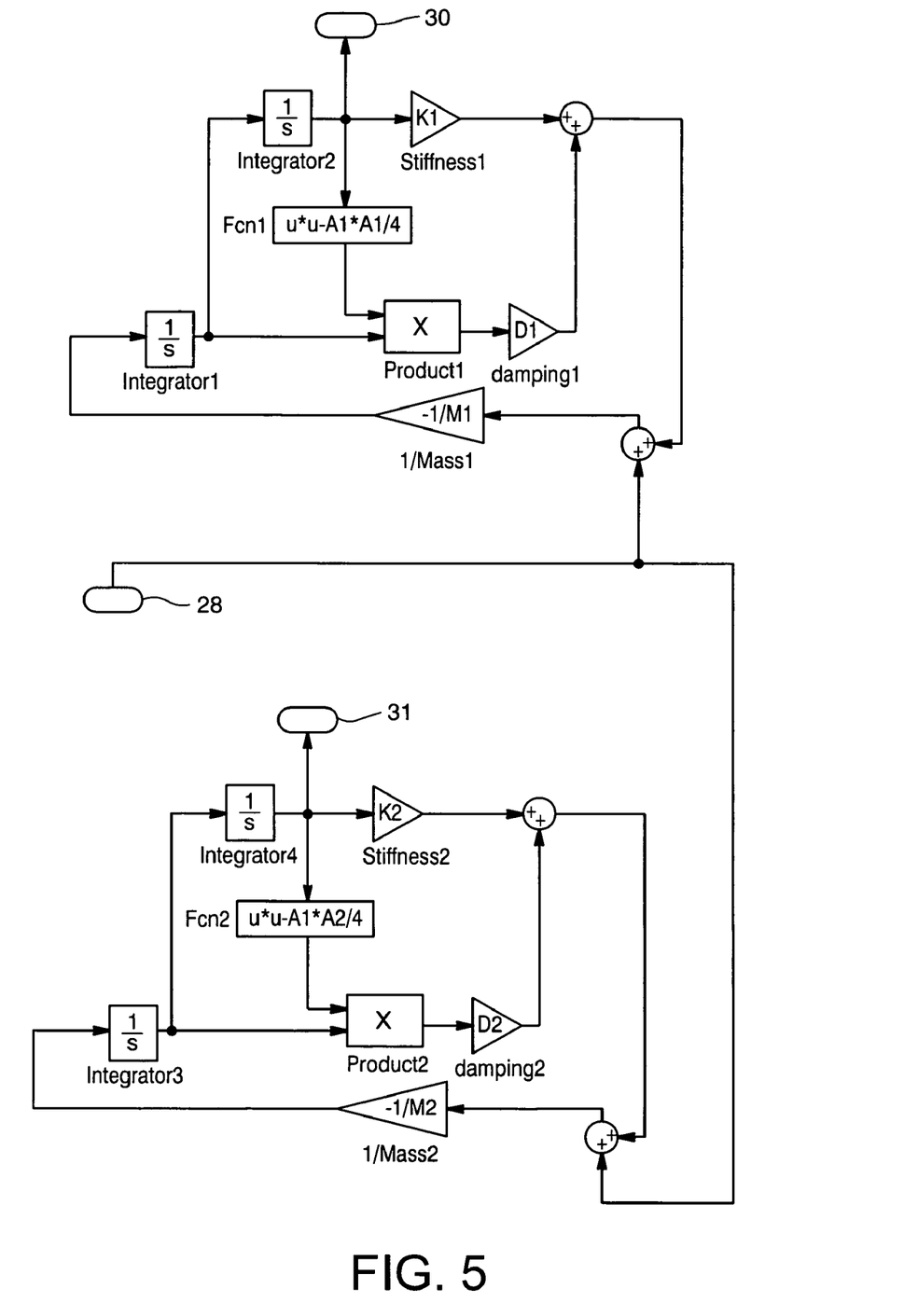
FIG. 5 is an exemplary embodiment of two connected oscillators of the Van der Pol Type usable with the system of FIG. 1.
Figure 6:
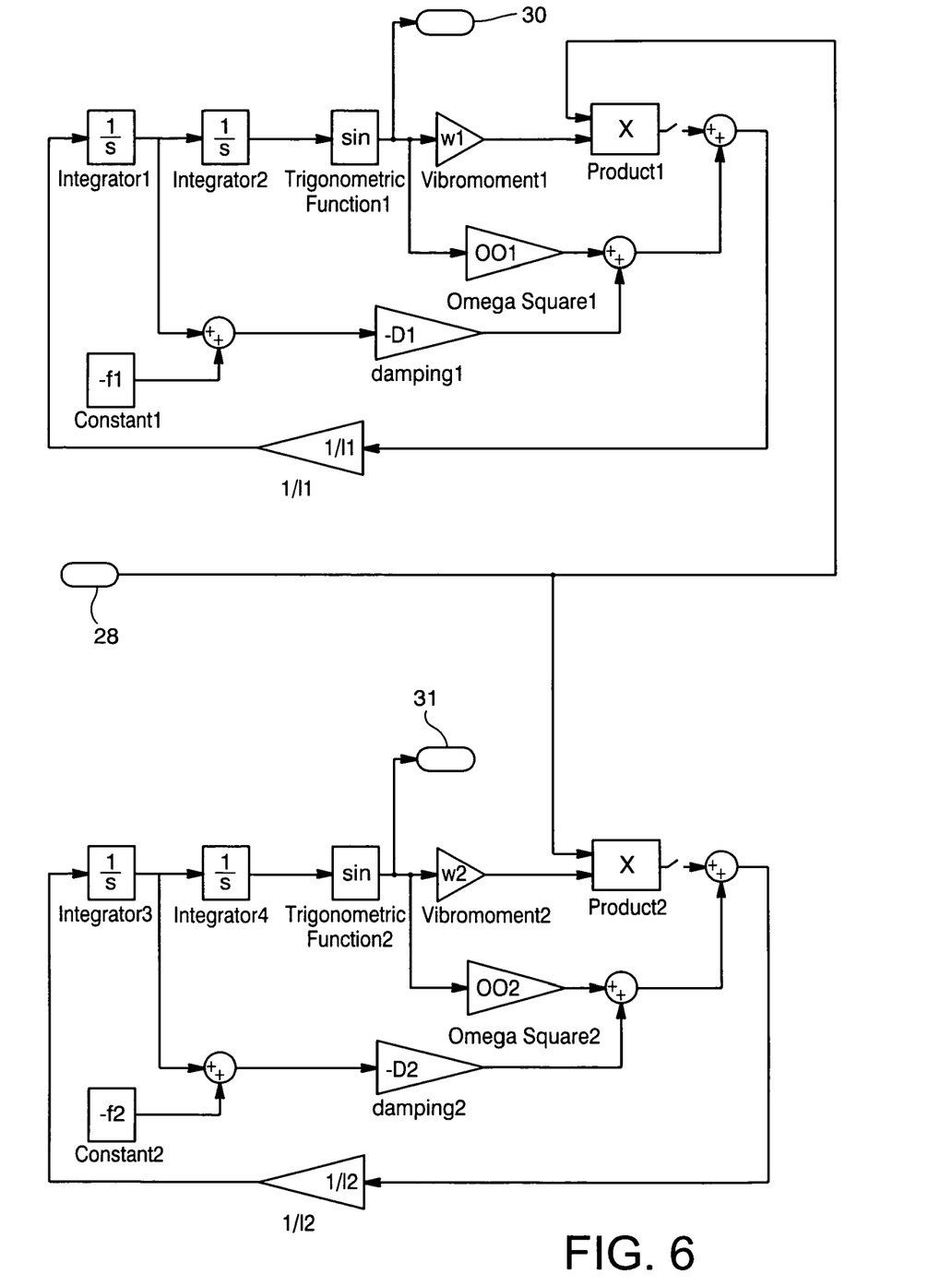
FIG. 6 is an exemplary embodiment of two connected oscillators of the Rotator Type usable with the system of FIG. 1.
Figure 7:
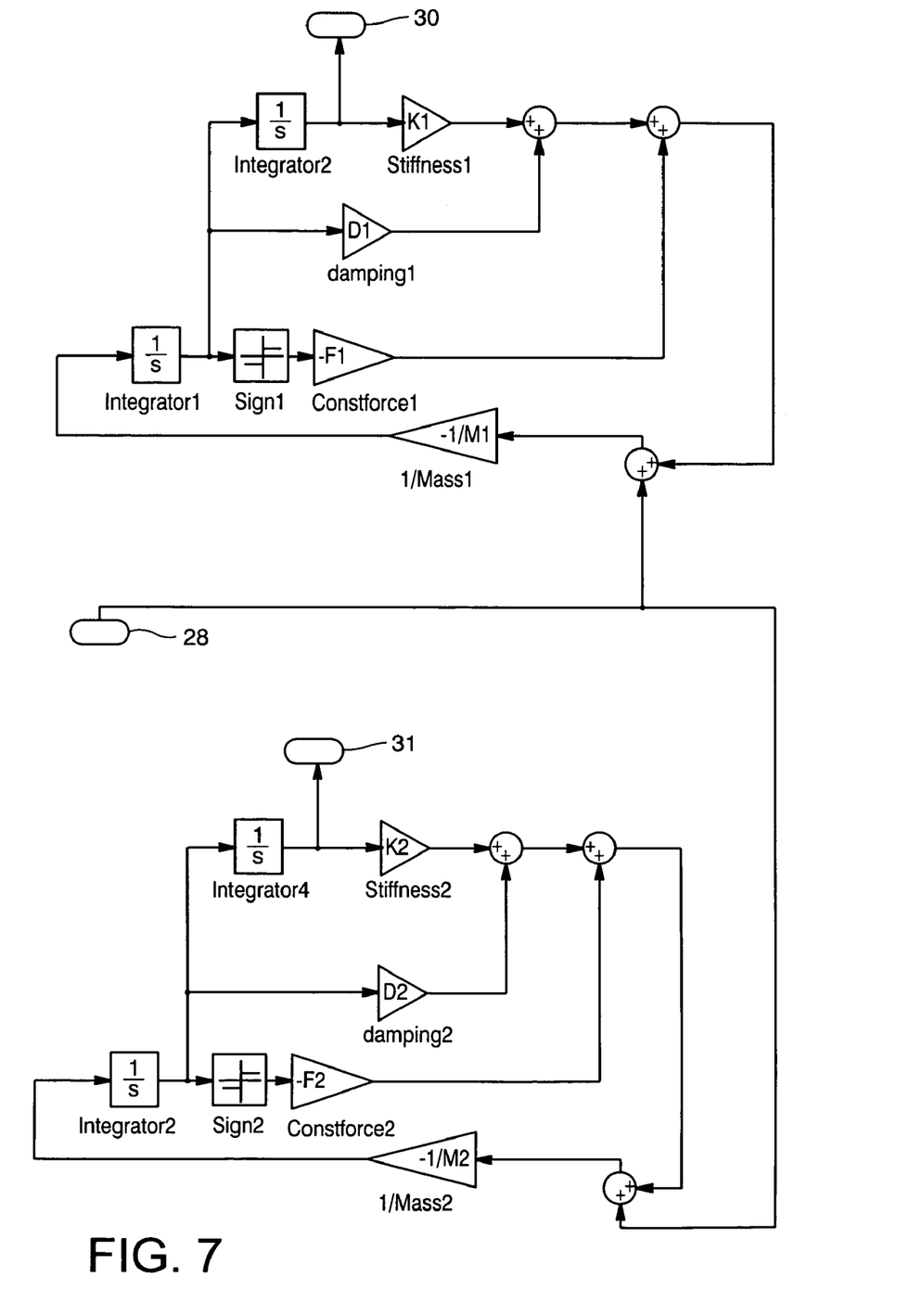
FIG. 7 is an exemplary embodiment of two connected oscillators of the Tracking Force Type usable with the system of FIG. 1.
Figure 8:
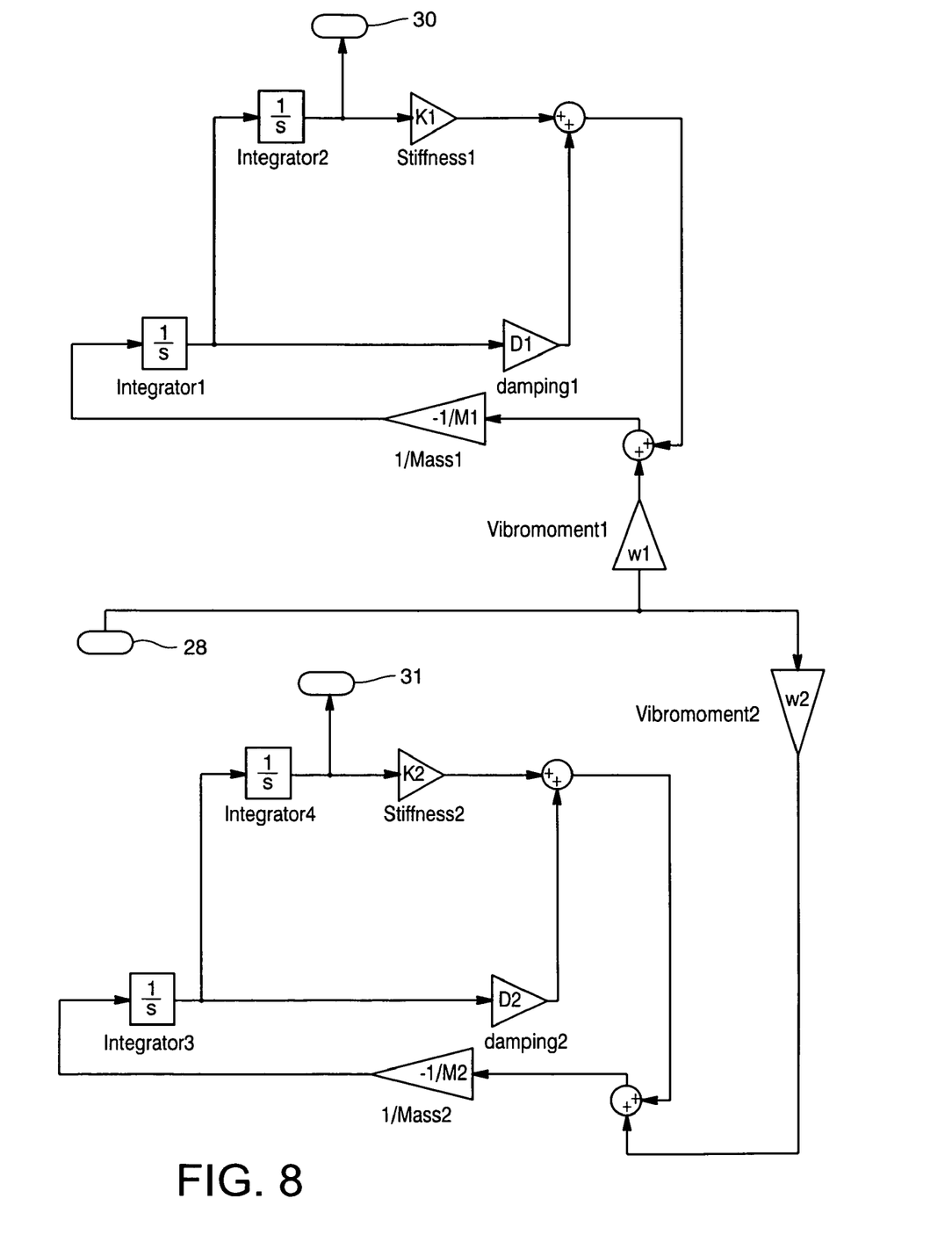
FIG. 8 is an exemplary embodiment of two connected oscillators of the Linear Type usable with the system of FIG. 1.

System 10 includes two connected oscillators 18 and 19 that are of the so-called General Type (FIG. 4). General Type Oscillators can be, but are not limited to, Van der Pol type (FIG. 5), Rotator type (FIG. 6), Tracking Force type (FIG. 7), Linear type (FIG. 8), or any other type of oscillator. Oscillators 18 and 19 in system 10 can also be of different (mixed) types. The Van der Pol type oscillator, the Rotator type oscillator, the Tracking Force type oscillator, the Linear type oscillator, are all oscillators familiar to any person well informed in the Nonlinear Dynamics field of knowledge.

FIG. 4 is an exemplary embodiment of a pair of connected oscillators that include a Van der Pol oscillator 18 and Linear oscillator 19. The Van der Pol oscillator 18 includes integrators 80 and 82, an output signal and amplitude device 84, a stiffness multiplier 86, a multiplier 88, a damping multiplier 90, a first adder 92, a second adder 94, and a negative inverse mass multiplier 96. Each of stiffness multiplier 86, negative inverse mass multiplier 96, and damping multiplier 90 may be an amplifier. Multiplier 88 may include a modulator.

The Linear oscillator 19 includes integrators 100 and 102, a stiffness multiplier 106, a damping multiplier 110, a first adder 112, a second adder 114, and a negative inverse mass multiplier 116. Each of stiffness multiplier 106, negative inverse mass multiplier 116, and damping multiplier 110 may be an amplifier.

Figure 9A:
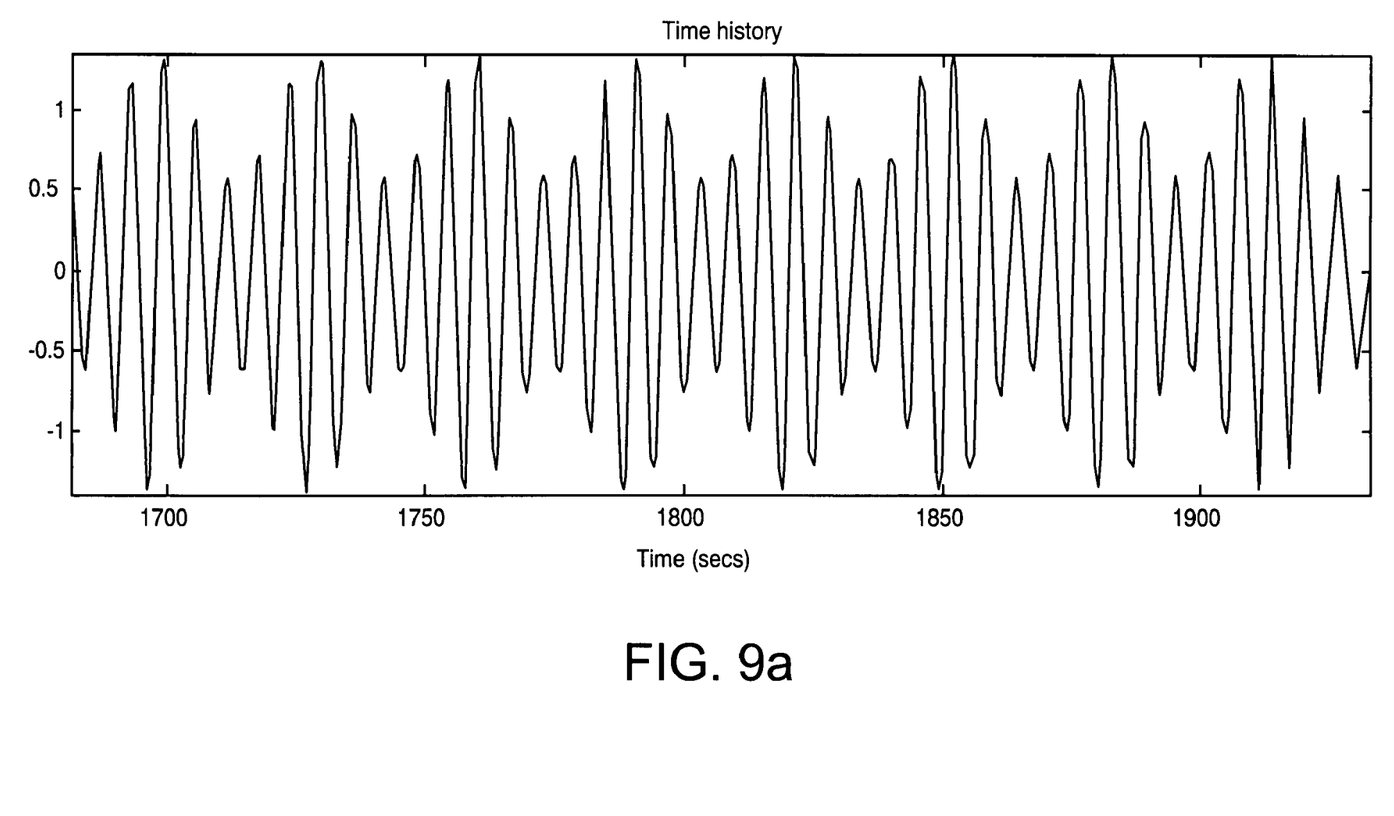
FIGS. 9a and 9b are graphs showing a sinusoidal modulated signal in the time domain and in the frequency domain, respectively.

Oscillators 18 and 19 receive the incoming signal from machine 12. This incoming signal consists of the sinusoidal modulated signal, as well as noise. As a result of the process of Dynamic Synchronization, the output of connected oscillators 18 and 19 will be the sinusoidal modulated signal with much less noise, thus providing clarification of the sinusoidal modulated signal. The clarified signal shown in FIG. 11*a* is much closer to the original signal shown in FIG. 9*a*, comparing to the mixture of the signal and noise, shown in FIG. 10*a*.

Figure 9B:
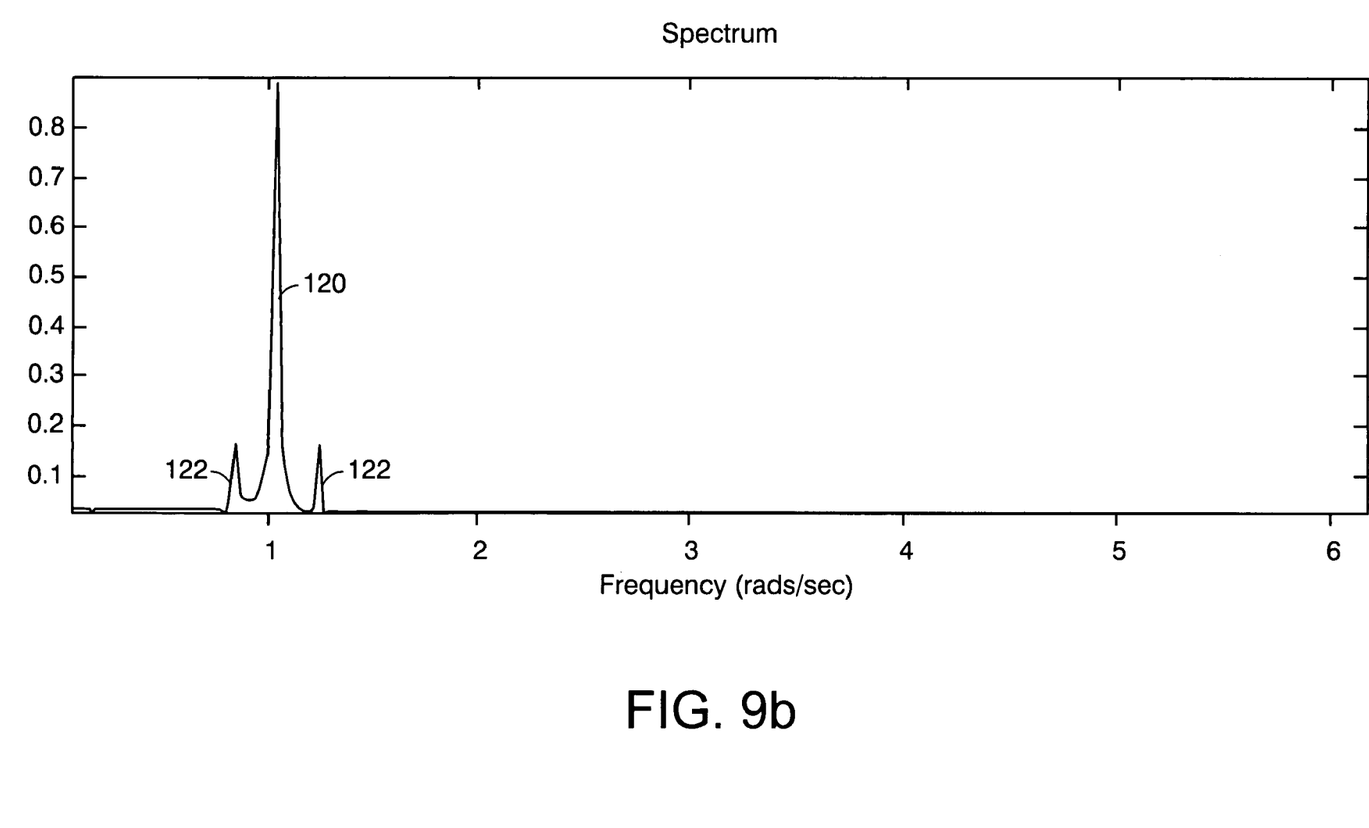
Figure 10A:
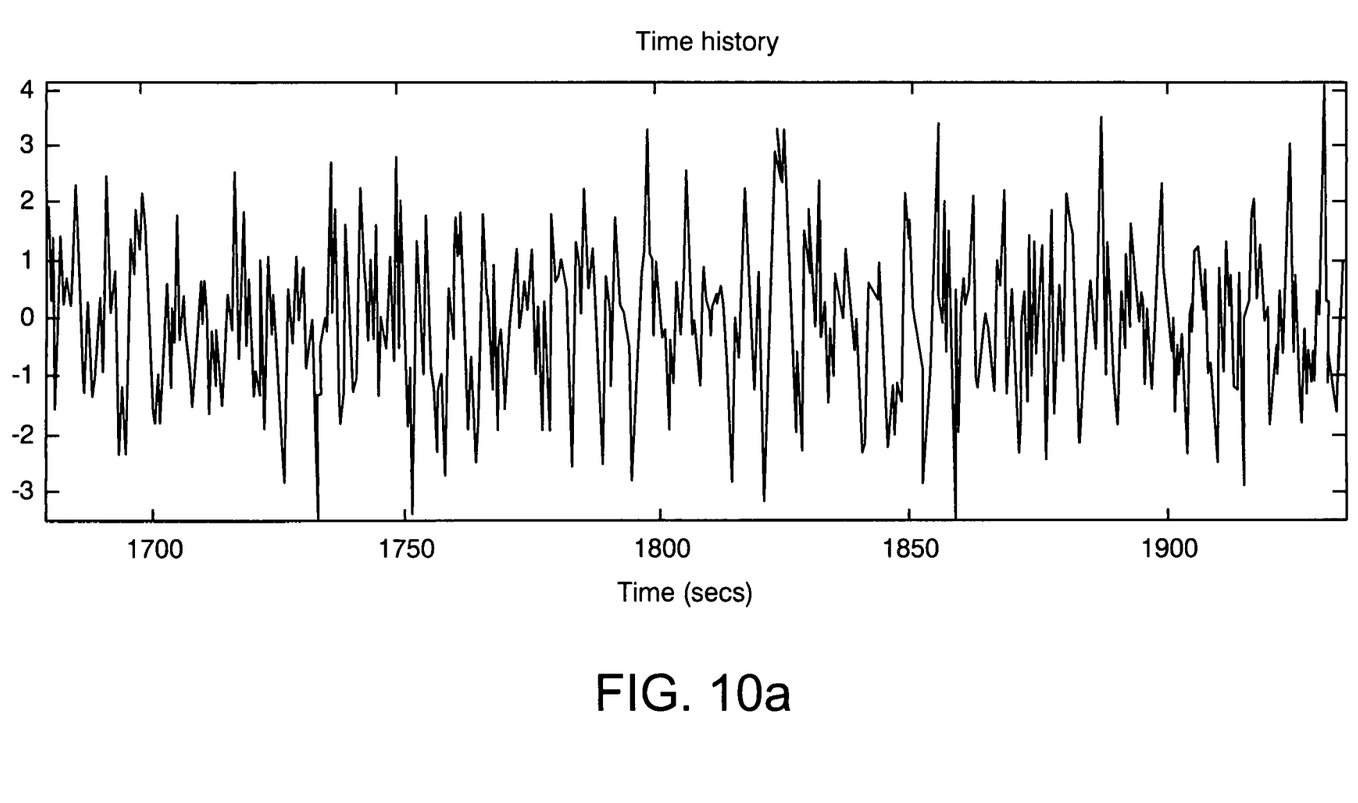
FIGS. 10a and 10b are graphs showing the sinusoidal modulated signal of FIGS. 9a and 9b surrounded by noise in the time domain and in the frequency domain, respectively.
Figure 10B:
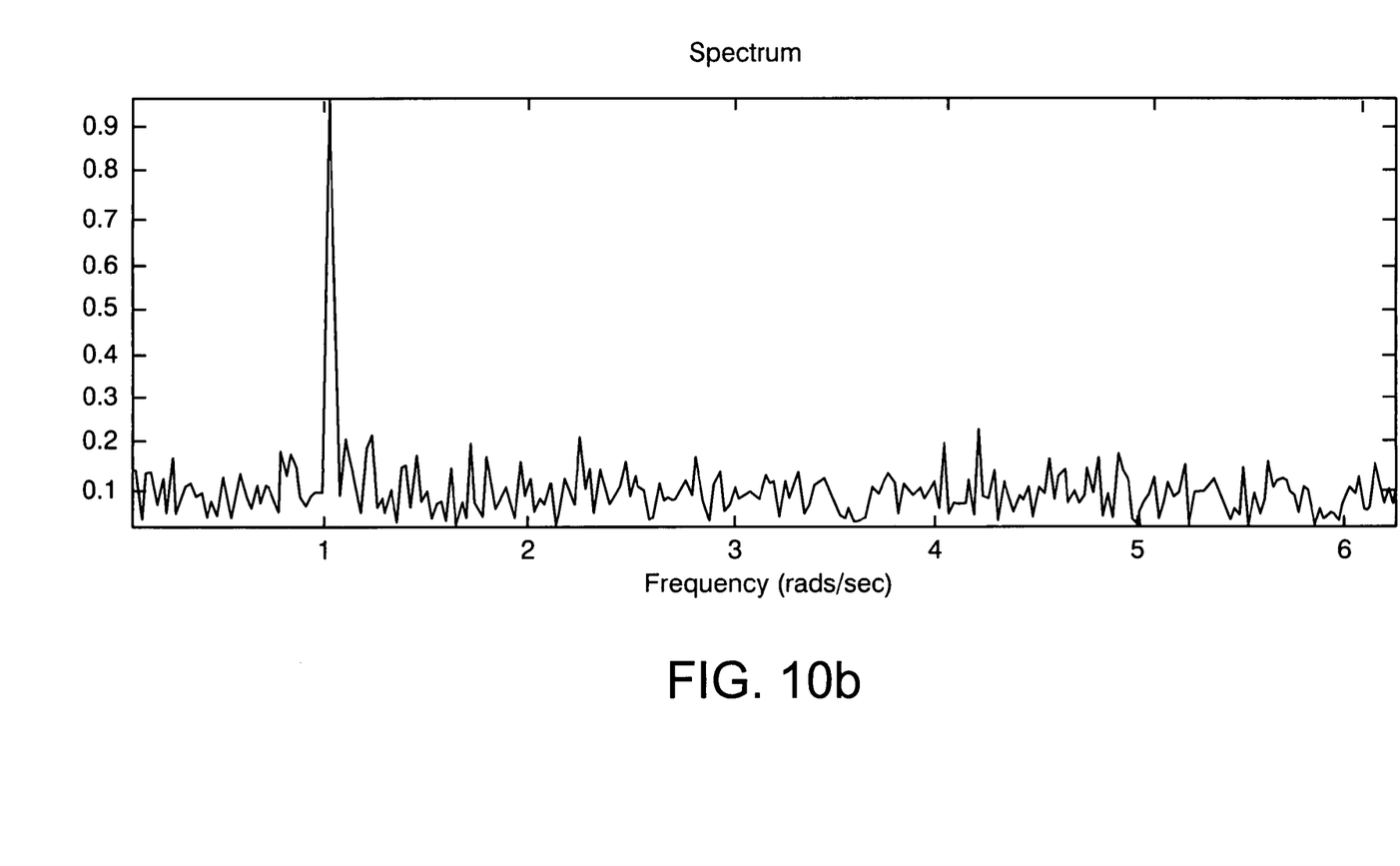

The emulation of oscillators 18 and 19 by processor 50 includes the use of certain coefficients that are chosen so that such oscillators are tuned to have oscillation frequencies that are approximately equal to the expected frequencies of the sinusoidal modulated signal 28. In spectrum, the sinusoidal modulated signal is seen as including a large center peak 120 and two smaller sidebands 122 (FIG. 9*b*). Coefficients for one oscillator are chosen so that its undisturbed frequency is somewhat close to the center spectral peak of sinusoidal modulated signal 28. Coefficients for the second oscillator are chosen so that its undisturbed frequency is somewhat close to a difference between frequency of the center peak and frequency of one of then sidebands.

Where machine 12 is an induction electric motor, the spectrum of motor's electric current is analyzed. There is a large peak at the so-called line frequency (usually, 60 Hz or 50 Hz). This large peak is surrounded by smaller sidebands, located at a distance of the so-called Pole-Pass Frequency on both sides of the line frequency. If these sidebands are too large, it indicates a serious malfunction, e.g., broken Rotor Bars and/or broken Side Rings in the Induction Motor.

Where machine 12 is an electric motor, its electric current waveform goes through a current transformer (sensor 14) to a probe, which transfers the signal further, for example, to a GE 3500 Monitoring System. The signal is further digitized and fed into computer 50. In computer 50, the signal is applied to emulation of appropriately tuned oscillators 18 and 19. The outputs of oscillators 18 and 19 are analyzed via a spectrogram (FIG. 11*b*) to determine whether the sidebands are too large or not.

The system 10 can be operated without any digitization of the incoming signal. In such a case, the incoming signal is picked up and, after appropriate conditioning (e.g., a conditioning amplifier for accelerometers), imposed upon a physical model of appropriately tuned oscillators 18 and 19. Outputs from oscillators 18 and 19 are then transferred to output device 22, which can be an oscilloscope, and analyzed.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for clarifying a sinusoidal modulated signal surrounded by noise that is output from a rotating machine to determine whether the machine is malfunctioning, the system comprising:
   a sensor that senses the sinusoidal modulated signal from the rotating machine,
   a first oscillator with a first adjustable oscillation frequency that receives the sensed signal and adjusts at least one of its operating coefficients to adjust the first oscillation frequency over time to be approximately the same as a center frequency of the sinusoidal modulated signal, a second oscillator with a second adjustable oscillation frequency that receives the sensed signal and adjusts at least one of its operating coefficients to adjust the second oscillation frequency over time to be approximately the same as a side band frequency of the sinusoidal modulated signal, the first and second oscillators using a process of dynamic synchronization, in which the noise surrounding the sinusoidal modulated signal pushes the first and second oscillation frequencies in opposite directions over time, to thereby eliminate the noise's impact on the first and second oscillation frequencies, to thereby adjust the first oscillation frequency to be approximately the same as a center frequency of the sinusoidal modulated signal and the second oscillation frequency to be approximately the same as the a side band frequency of the sinusoidal modulated signal, whereby the noise surrounding the sinusoidal modulated signal is reduced so that the sinusoidal modulated signal is clarified.

2. The system of claim 1 further comprising a transform device for transforming the clarified sinusoidal modulated signal from the time domain to the frequency domain, wherein the clarified sinusoidal modulated signal's spectral peaks are extracted for analysis.

3. The system of claim 2 further comprising a display device for displaying the clarified sinusoidal modulated signal's the spectral peaks of the clarified sinusoidal modulated signal for analysis.

4. The system of claim 1, wherein the first and second oscillators are of the same type.

5. The system of claim 4, wherein the first and second oscillators are selected from the group consisting of General type oscillators, Van der Pol type oscillators, Rotator type oscillators, Tracking Force type oscillators, and Linear type oscillators.

6. The system of claim 1, wherein the first and second oscillators are of two different types.

7. The system of claim 6, wherein the first and second oscillators are selected from the group consisting of General type oscillators, Van der Pol type oscillators, Rotator type oscillators, Tracking Force type oscillators, and Linear type oscillators.

8. The system of claim 1, wherein the sensor is an electromagnetic transducer that senses a change in electromagnetic signals caused by an oscillation, such as a rotation, of the machine.

9. The system of claim 1, wherein the rotating machine is an electric motor and wherein the sensor is a current transformer that senses an electric current waveform of the motor.

10. The system of claim 1, wherein the sensor is an accelerometer that picks up a vibration signal from the machine.

11. The system of claim 1 further comprising a computer for emulating the first and second oscillators.

12. The system of claim 11 further comprising an analog to digital converter for receiving an analog of the sinusoidal modulated signal sensed by the sensor and converting the analog signal to a digital form.

13. The system of claim 2 further comprising a computer for emulating the first and second oscillators and the transform device.

14. The system of claim 13, wherein the computer transforms the incoming sinusoidal modulated signal from the time domain to the frequency domain, and wherein the computer determines, based on the frequency domain signal, whether the oscillation frequencies of the first and second oscillators are approximately the same as the center and one of the side band frequencies of the sinusoidal modulated signal, and adjusts repeatedly the first and second oscillator operating modes to dynamically synchronize the oscillation frequencies of the first and second oscillators with the frequencies of the sinusoidal modulated signal.

* * * * *

UNITED STATES PATENT AND TRADEMARK OFFICE
CERTIFICATE OF CORRECTION

PATENT NO. : 7,855,545 B2
APPLICATION NO. : 11/653852
DATED : December 21, 2010
INVENTOR(S) : Petchenev et al.

Page 1 of 1

It is certified that error appears in the above-identified patent and that said Letters Patent is hereby corrected as shown below:

At Column 4, line 67 to Column 5, line 1, delete "Processor processes" and insert --Processor 52 processes--

At Column 5, line 2, delete "oscillators 18 and with" and insert --oscillators 18 and 19 with--

In the Claims:

At column 7, line 7, Claim 1, delete "side hand" and insert --side band--

Signed and Sealed this
Eighth Day of March, 2011

David J. Kappos
*Director of the United States Patent and Trademark Office*